Figure 2:
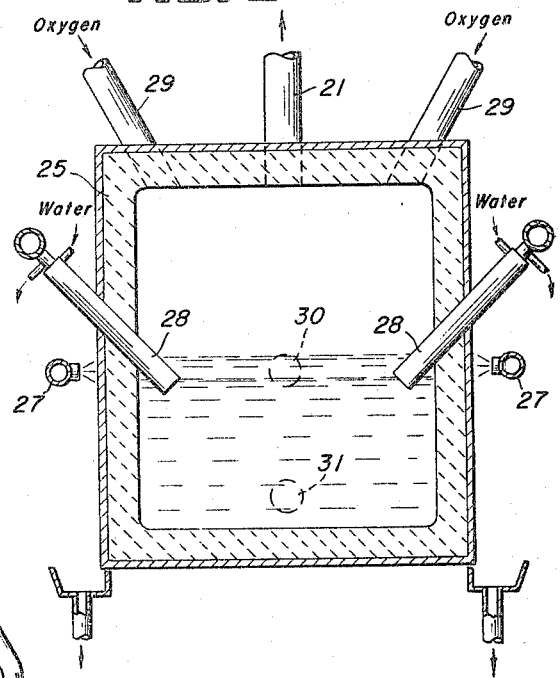

INVENTORS
JAGDISH C. AGARWAL and
WILLIAM L. DAVIS, Jr.
By Donald G. Dalton
Attorney United States Patent Office 3,264,096
Patented August 2, 1966

3,264,096
METHOD OF SMELTING IRON ORE
Jagdish Chandra Agarwal, Penn Hills Township, Allegheny County, and William Landon Davis, Jr., Monroeville Borough, Pa., assignors to United States Steel Corporation, a corporation of Delaware
Filed Dec. 19, 1963, Ser. No. 331,830
6 Claims. (Cl. 75—40)

This invention relates to the production of steel directly from iron ore and, in particular, to the reduction of iron ore in the molten state to produce liquid metal of high purity.

While the smelting of iron ore as ordinarily conducted in a blast furnace involves contact between reducing gases and iron oxide in solid form, proposals were made many years ago to reduce ore in molten form (United States Patents 910,707 and 1,156,775). Such proposals have proved impossible of realization, however, because of the destructive effect of the molten ore on refractory materials used to line the vessels containing it and the inability to transfer the requisite endothermic heat of reduction at a high enough rate to make the process continuous and commercially feasible. We have invented a novel method of reducing molten iron ore whereby previous difficulties are overcome and operation on a commercial scale is possible.

In a preferred practice of our method, we establish a high-temperature flame in a melting chamber by burning a mixture of fuel and oxygen therein. By using commercial oxygen, e.g., 95% $O_2$, we are able to produce an oxy-fuel flame having a temperature in excess of 3500° F. and introduce thereinto, in the form of small pieces or fragments, e.g., generally less than ¼" in size, iron ore and limestone which has been preheated to a temperature of about 1700° F. The ore is melted by the flame and falls into the chamber therebelow where it collects in a pool. We drain the collected molten ore from the melting chamber to a separate reducing chamber and introduce a reductant thereinto, below the surface of the molten contents. We also introduce oxygen into the reducing chamber for partial combustion with unused reductant, thereby maintaining the body of molten ore at the temperature necessary for reduction and supplying the necessary heat for the reduction reaction. The molten ore is thereby reduced and the resulting iron sinks while the slag floats thereon. Iron and slag may then be tapped from different levels. We remove from the reduction chamber the gas resulting from partial combustion of the reductant and conduct it to the melting chamber where it serves as the combustible component of the mixture fired in the melting flame.

The melting and the reducing chambers are cooled by spraying or circulating water on the outside walls to freeze on the interior a protective layer of iron oxide, thereby minimizing the destruction of the refractories.

Figure 1:
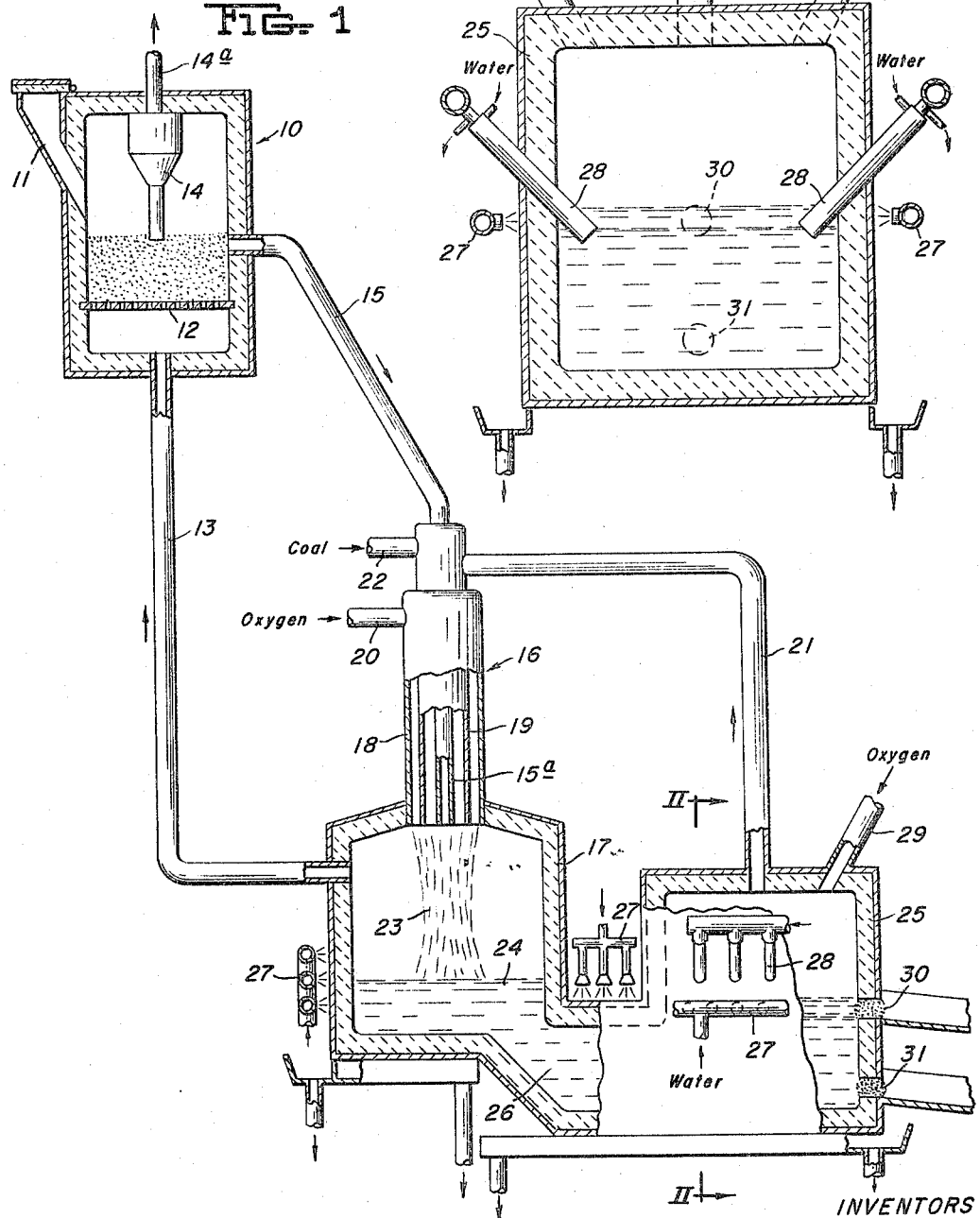

A complete understanding of the invention may be obtained from the following detailed description and explanation which refer to the accompanying drawings illustrating the present preferred embodiment. In the drawings:

FIGURE 1 is a diagrammatic elevation, largely in section, showing a preferred form of apparatus useful in carrying out our method; and FIGURE 2 is a transverse section, taken along the plane of line II—II of FIGURE 1, showing the provisions for injecting the reductant below the surface of the molten contents.

Referring now in detail to the drawings and, for the present, particularly to FIGURE 1, raw ore and limestone flux of the size indicated (−¼") are charged into a fluidized-bed preheater 10 through a chute 11. The preheater which may include two or more stages in series if desired, has a perforated supporting plate 12 spaced above the bottom thereof. A pipe 13 conducts hot gas into the preheater plenum chamber below plate 12 from a source to be described later. A cyclone separator 14 in the preheater is connected to a gas outlet pipe 14a which conducts the off gases away. Preheater 10 is provided with conventional automatic temperature-control means.

An outlet pipe 15 for solids extends from preheater 10 to a burner 16 firing downwardly into a melting chamber 17. The burner has suitable provisions for water-cooling (not shown). Burner 16 includes an outer oxygen tube 18 with a combustible-gas tube 19 and an ore-feeding tube 15a disposed coaxially therein. Pipe 15 is connected to tube 15a. An oxygen supply pipe 20 extends to tube 18 from any convenient source of oxygen of a concentration from 75 to 98%. Generally, ordinary commercial oxygen (95%) will be found preferable. A pipe 21 extends to tube 19 from a supply of combustible gas to be described later. A pipe 22 is also connected to tube 19 for supplying supplementary fuels such as powdered coal when desired. Off-gas from chamber 17 is conducted to preheater 10 by pipe 13.

Conventional control valves (not shown) in the line 15 permit the downward flow of preheated solids from the preheater but limit the bypassing of gases from the melting chamber. If the ore and limestone are not of generally similar size consist, they should be preheated in separate fluidized-bed chambers and combined at the burner 16.

The combustible gas supplied to tube 19 and the coal supplied through pipe 22, if used, upon ignition, burn in the oxygen supplied through tube 20, forming a jet of flame 23. Ore and limestone which have been partially calcined in preheater 10 enter the flame through tube 15a, melt and fall to the floor of chamber 17 and collect in a pool 24. Molten ore drains from chamber 17 to a reducing chamber 25 at a slightly lower level, through a connecting passage 26. Water sprays 27 are directed on the exterior of the chambers 17 and 25 and the passage 26 to cool them and to cause a protective layer of the material contained therein to freeze on the interior of their linings.

A carbon-containing reductant is introduced into chamber 25 below the surface of the molten contents thereof. By way of example, tuyeres 28 in the side of chamber 25 permit the introduction of oil, natural gas or powdered coal entrained in inert gas. The intimate contact resulting between the molten ore and the reductant causes reduction of the molten iron oxide to metallic iron. The endothermic heat needed for this reaction is furnished by the partial combustion of unused reductant with oxygen introduced into chamber 25 through a pipe 29, above the surface of the molten contents. Pipe 21 is connected to chamber 25 to conduct therefrom to tube 19 the gases resulting from partial combustion of the unused reductant and gases resulting from the reduction reaction, above the surface of the molten material. Iron formed by the reduction of ore in chamber 25 sinks to the bottom and forms an interface with molten slag floating thereon. The slag and metal may be separately tapped through vertically spaced ports 30 and 31, respectively.

For illustrative purposes, a theoretical example of the practice of our method will now be given, using first pure hematite. After grinding and screening this material to 100% minus ¼", it is passed through preheater 10 and its temperature thereby raised from ambient to about 1700° F. It then flows through pipe 15 and tube 15a. In traversing flame 23, the ore temperature is further raised to about 3000° F. and it is wholly melted. The molten hematite flowing from chamber 17 to chamber 25 is reduced to metal by contact with reductant therein. Starting with the reducing chamber 25, 1.5 mol of carbon at 77° F. are injected through tuyeres 28 into 0.5 mol of molten hematite at 3000° F. and the resulting reduction produces 1 mol of molten iron at 2800° F. To supply the 95,335 B.t.u. required for this endothermic reaction, approximately 60% of the 1.5 mol of carbon monoxide generated during the reduction is burned with oxygen in the freeboard of chamber 25. The remaining 40% of used carbon monoxide returning through pipe 21 to chamber 17 is burned with oxygen to supply the 46,435 B.t.u. required to produce molten hematite at 3000° F. from solid hematite at 1700° F. The sensible heat in the 1.5 mol of resulting $CO_2$ at 3000° F. flows through pipe 13 to preheater 10 and is sufficient to preheat the hematite feed therein from 77° F. to 1700° F.

It is to be noted that, in the reducing chamber 25, after burning 60% of the carbon monoxide to carbon dioxide, the $CO_2/CO$ ratio is 1.5. The equilibrium ratio of $CO_2/CO$ over iron at 2800° F. is approximately 0.25 so the gas composition in the reducing chamber is actually highly oxidizing to molten iron. The accomplishment of reduction in a vessel having oxidizing conditions will be explained below.

For simplicity, the preceding theoretical example assumed pure hematite, carbon and oxygen, and no thermal losses. A practical example of the operation of our invention when using hematite ore, coal and commercial (95%) oxygen will now be given. For convenience, all material quantities are arbitrarily based upon one ton of molten metal product containing essentially pure iron. Ore (3400 lb.) and limestone (1000 lb.) were ground to pass through a 10-mesh screen and were fed to the fluidized-bed preheater 10. Here the ore was dried, the limestone was partially calcined, and both the materials were preheated to approximately 1700° F. by sensible-heat exchange with the off-gases from the melting chamber 17, which entered the preheater at a temperature of approximately 3000° F. Cyclone separator 14, returned entrained solid material to the fluidized bed.

From the preheater, the hot ore and the partially calcined limestone at approximately 1700° F. were fed continuously to the melting chamber 17 through pipe 15 and the burner 16. The ore and limestone passed through tube 15a, the incoming combustible off-gases from pipe 21 entered through the inner coaxial tube 19 and 5900 s.c.f. of 95% oxygen from pipe 20 was supplied through the outer coaxial tube 18 of the burner. The heat generated by the combustion of the reducer off-gases with oxygen issuing from the burner was sufficient to melt the ore in the flame, complete the limestone calcination, and to produce a molten pool in chamber 17 at approximately 3000° F. The off-gases from the melting chamber then passed through line 13 into the preheater 10 as previously described.

The molten ore from pool 24 flowed through passage 26 and into reducing chamber 25 where 1070 lb. of powdered coal was injected through tuyeres 28 by inert gas, e.g., nitrogen. Molten metal and approximately 1120 lb. of slag were withdrawn from their respective tap holes 31 and 30. Approximately 70% of the combustible gases (consisting mainly of CO) produced by the reduction of the molten ore by coal were partially burned in the freeboard of chamber 25 with 12,500 s.c.f. of 95% oxygen introduced through pipe 29. Sufficient heat was generated by this combustion reaction and was transferred to the molten slag coming to the top and the metal therebelow to sustain the endothermic reduction reactions and to maintain the temperature of the molten metal, slag and gases in the reducing chamber 25 at approximately 3000° F., 3000° F. and 3500° F., respectively.

The metal thus produced was iron of better than 99% purity from which steel may be made directly by the addition of the desired alloying elements.

The advantages of our process include the direct use of reductants such as coal, oil and natural gas and of run-of mine fine ores after simple screening procedures. Preheating of the solid, liquid or gaseous reactants is not essential. The consumption of reductant is low compared with conventional processes because the off-gases contain practically no chemical energy. The capital investment is low because of the elimination of coal coking, ore agglomeration, the blast furnace, conventional steelmaking furnaces, ladle moving and gas-preheating facilities.

The novel features of our process which are responsible for the advantages thereof are as follows: The formation of a solid layer on the interior of the melting and reducing chambers by external cooling thereof permits the containment of molten iron oxide in conventional refractories. The melting of ore in a separate chamber prior to reduction permits using essentially the stoichiometric quantity of reducing agents in the reducing chamber. The latter, furthermore, requires a heat input only sufficient to supply the endothermic heat of reaction, because all other heat quantities such as preheating and the latent heat of fusion have been supplied elsewhere. A thermal balance is accordingly achieved in the reducing chamber by burning only from one-half to two-thirds of the combustible gases necessarily generated by the reduction reactions.

The required combustion in the reducing chamber of an appreciable portion of the combustible gases generated by reduction implies that the atmosphere above the molten bath is highly oxidizing to metallic iron. In a dynamic and countercurrent flow process, as provided by our invention, however, we have found that it is possible to maintain highly oxidizing conditions in the freeboard of the reducing chamber while maintaining highly reducing conditions below the surface of the molten bath. The reducing conditions are continuously maintained below a protective slag layer and the reducing gases continuously being generated flow upward. Thus, the oxidizing flame in the freeboard, even though it impinges upon the protective slag layer, has no effect on the reduction reactions occurring beneath the surface.

The over-all rate of reduction is considerably higher than in conventional processes because, in our invention, essentially all reduction of iron oxides is performed in the liquid phase at temperatures near 3000° F., and the production rate of iron therefore is also higher. The blast furnace, for example, performs a large percentage of the iron ore reduction by gas-solid reaction at relatively low temperatures in the stack zones of the furnace. The lower reduction rates at the lower temperatures in the stack (below 2000° F.) impose a severe limitation as compared to our invention.

In our invention, the unburned combustible gases from the reducing chamber are usually sufficient to supply the heat needed for melting the ore. Therefore, extra fuel is seldom needed for this purpose. Furthermore, complete combustion of fuel is performed in the melting chamber, which accounts for the fact that there is essentially no calorific heating value in the final off-gas. It is obvious also that there are no equilibria limitations in the melting chamber. Substantially complete combustion is desirable and is attained.

Although we have disclosed herein the preferred practice of our invention, we intend to cover as well any change or modification therein which may be made without departing from the spirit and scope of the invention.

We claim:

1. In a method of smelting iron ore, the steps comprising firing an oxy-fuel flame into a melting chamber, introducing ore and flux in a size range generally less than ¼″, into said flame in the direction thereof and collecting molten material therebelow draining the molten material to a separate reducing chamber, introducing a granular, solid carbonaceous reductant into said reducing chamber below the surface of the molten contents thereof, introducing oxygen into the reducing chamber thereby maintaining an oxidizing condition above said surface and, after separation of molten slag and molten metal, tapping them separately.

2. A method as defined in claim 1, characterized by introducing the ore downwardly through the center of said flame.

3. A method as defined in claim 1, characterized by firing streams of oxygen and fuel coaxially to feed said flame.

4. In a method of smelting iron ore, the steps comprising introducing ore and flux in a size range generally less than ¼" into an oxy-fuel flame in the direction thereof thereby melting them, introducing a granular, solid carbonaceous reductant below the surface of the resulting molten mass, introducing oxygen into the space above said mass thereby maintaining an oxidizing condition in said space and, after separation of molten slag and moten metal, tapping them separately.

5. In a method of smelting iron ore, the steps comprising firing an oxy-fuel flame into a melting chamber, introducing ore and flux in a size range generally less than ¼", into said flame and collecting molten material there-below, draining the molten material to a separate reducing chamber, introducing a reductant into said reducing chamber below the surface of the molten contents thereof, cooling said melting and reducing chambers externally, thereby causing a protective layer of molten material contained therein to freeze on the interior thereof, introducing oxygen into the reducing chamber thereby maintaining an oxidizing condition above said surface and, after separation of molten slag and molten metal, tapping them separately.

6. In a method of smelting iron ore, the steps comprising firing an oxy-fuel flame into a melting chamber, introducing ore and flux in a size range generally less than ¼", into said flame in the direction thereof and collecting molten material therebelow, introducing a granular solid carbonaceous reductant into said molten material below the surface thereof, introducing oxygen above the surface of said molten material thereby maintaining an oxidizing condition above said surface and, after separation of molten slag and molten metal, tapping them separately.

References Cited by the Examiner
UNITED STATES PATENTS

| | | | |
|---|---|---|---|
| 1,768,622 | 7/1930 | Madorsky | 75–40 |
| 2,745,733 | 5/1956 | Oster | 75–40 |
| 2,973,260 | 2/1961 | Nogiwa | 75–26 |

HYLAND BIZOT, *Primary Examiner.*

DAVID L. RECK, *Examiner.*

H. F. SAITO, *Assistant Examiner.*